US007697066B2

(12) United States Patent
Leary

(10) Patent No.: US 7,697,066 B2
(45) Date of Patent: Apr. 13, 2010

(54) METHOD AND APPARATUS FOR DETECTING DATA IN A VERTICAL BLANKING INTERVAL

(75) Inventor: Patrick J. Leary, Horsham, PA (US)

(73) Assignee: General Instrument Corporation, Horsham, PA (US)

(*) Notice: Subject to any disclaimer, the term of this patent is extended or adjusted under 35 U.S.C. 154(b) by 1079 days.

(21) Appl. No.: 11/287,816

(22) Filed: Nov. 28, 2005

(65) Prior Publication Data

US 2007/0121003 A1    May 31, 2007

(51) Int. Cl.
*H04N 7/08*  (2006.01)
(52) U.S. Cl. ..................................... 348/478
(58) Field of Classification Search .............. 348/476, 348/461, 465, 473, 477–479, 468, 184, 189, 348/180
See application file for complete search history.

(56) References Cited

U.S. PATENT DOCUMENTS

| | | | | |
|---|---|---|---|---|
| 5,699,124 A * | 12/1997 | Nuber et al. | ................. | 348/465 |
| 5,812,207 A * | 9/1998 | Cahill, III | ................... | 348/465 |
| 6,005,632 A * | 12/1999 | Cahill, III | ................... | 348/465 |
| 6,377,308 B1 * | 4/2002 | Cahill, III | ................... | 348/461 |
| 6,865,337 B1 * | 3/2005 | Muller | ........................ | 386/94 |
| 6,912,009 B2 * | 6/2005 | Orii | ............................ | 348/465 |
| 7,391,471 B1 * | 6/2008 | Cucinotta | .................... | 348/473 |
| 7,415,718 B1 * | 8/2008 | Wang et al. | ................. | 725/136 |
| 7,440,677 B2 * | 10/2008 | Strasser | ....................... | 386/94 |
| 7,479,981 B2 * | 1/2009 | Tierney et al. | .............. | 348/184 |
| 2006/0288399 A1 * | 12/2006 | Tierney et al. | .............. | 725/136 |
| 2007/0019114 A1 * | 1/2007 | de Garrido et al. | .......... | 348/701 |

* cited by examiner

*Primary Examiner*—Paulos M Natnael
(74) *Attorney, Agent, or Firm*—Larry T. Cullen

(57) ABSTRACT

An apparatus (10) and method (40) is provided for detecting data within the vertical blanking interval (VBI) lines of a video or television signal. The VBI data detection (18) samples (42) at least one point from the VBI lines of a video signal and compares (44) at least one data characteristic, such as luminance, from the sample to a threshold to determine if the sample contains VBI data. If the sample contains VBI data, the VBI line from which the sample was taken is routed (46) to the processing unit of a video processing device. If no samples from a VBI line are found to contain VBI data, the VBI line is not processed further. The VBI data detection apparatus improves processing efficiency and resource allocation by allowing only those VBI lines containing VBI data to be processed by the video processing device.

18 Claims, 3 Drawing Sheets

METHOD AND APPARATUS FOR DETECTING DATA IN A VERTICAL BLANKING INTERVAL

BACKGROUND OF THE INVENTION

1. Field of the Invention

The invention relates to television signal processing. More particularly, the invention relates to the vertical blanking interval (VBI) portion of a television signal.

2. Description of the Related Art

A vertical blanking interval (VBI) is a portion of an analog video or television signal that is blanked, or left clear, of video or audio information to allow time for the electron gun in a television monitor's cathode ray tube (CRT) to move from the bottom to the top of the screen as it scans images. The VBI often is used to carry information other than video or audio information, such as test signals, reference signals, closed-caption signals for the hearing impaired, emergency weather information or stock market data. Also, recently, internet designers have been using the VBI to broadcast HyperText Markup Language (HTML)-formatted information, e.g., from web sites to web subscribers. The VBI typically is expressed as the number of horizontal lines scanned.

Typically, the broadcaster, such as the cable television provider, inserts or datacasts VBI data into the VBI portion of the television signal. The television signal then is transmitted to one or more video processing devices, such as signal converter or decoder (set-top) boxes, video cassette recorders (VCRs), digital video disk (DVD) recorders, or other suitable video (and audio) receivers. From the video processing devices, the television signal then is transmitted to a user system, typically a television.

Video processing devices have to pass VBI data through the device, i.e., from the device input to the device output, to make the data available to other processing devices that may be connected thereto. Not all scanned lines in the VBI contain data, thus it is inefficient for the processor in the video processing device to read all of the VBI lines to decode VBI data that may be contained only in a few of the scanned lines. Reading all of the scanned lines of the VBI can occupy valuable processing resources of the video processing device that otherwise can be used for the primary purposes of the video processing device, such as delivering audio and video services and supporting internal device programs like playback and recording functions.

BRIEF SUMMARY OF THE INVENTION

In accordance with the principles of the invention, a method for detecting data in a vertical blanking interval (VBI) line, the VBI line including a plurality of points, the method may comprise: sampling at least one point of at least one VBI line; determining if the level of at least one data characteristic of the at least one sampled point in the VBI line is greater than or equal to a first threshold; and routing the VBI line to a first data path if the level of the at least one data characteristic of the at least one sampled point in the VBI line is greater than or equal to the first threshold, wherein the first data path comprises a data path through a processing unit of a processing device, wherein, if the VBI line is determined not to include any sampled points that have the level of the at least one data characteristic greater than or equal to the first threshold, the VBI line is not routed to the processing unit.

In accordance with the principles of the invention, an apparatus for detecting data in a vertical blanking interval (VBI) line, the VBI line including a plurality of points, the apparatus may comprise: a sampler for sampling at least one point of at least one VBI line; a comparator for determining if the level of at least one data characteristic of the at least one sampled point in the VBI line is greater than or equal to a first threshold, and a router for routing the VBI line to a processing unit of a processing device if the level of the at least one data characteristic of the at least one sampled point in the VBI line is greater than or equal to the first threshold, wherein, if the comparator determines that the VBI line does not include any sampled points that have the level of the at least one data characteristic greater than or equal to the first threshold, the router does not route the VBI line to the processing unit.

In accordance with the principles of the invention, a computer readable medium, only readable by a computer, carrying a computer program for detecting data in a vertical blanking interval (VBI) line, the VBI line including a plurality of points, the computer readable medium may comprise: code for sampling at least one point of at least one VBI line; code for determining if the level of at least one data characteristic of the at least one sampled point in the VBI line is greater than or equal to a first threshold; and code for routing the VBI line to a first data path if the level of the at least one data characteristic of the at least one sampled point in the VBI line is greater than or equal to the first threshold, wherein the first data path further comprises a data path through a processing unit of a processing device, wherein, if the VBI line is determined not to include any sampled points that have the level of the at least one data characteristic greater than or equal to the first threshold, the VBI line is not routed to the processing unit.

DETAILED DESCRIPTION

Figure 1:
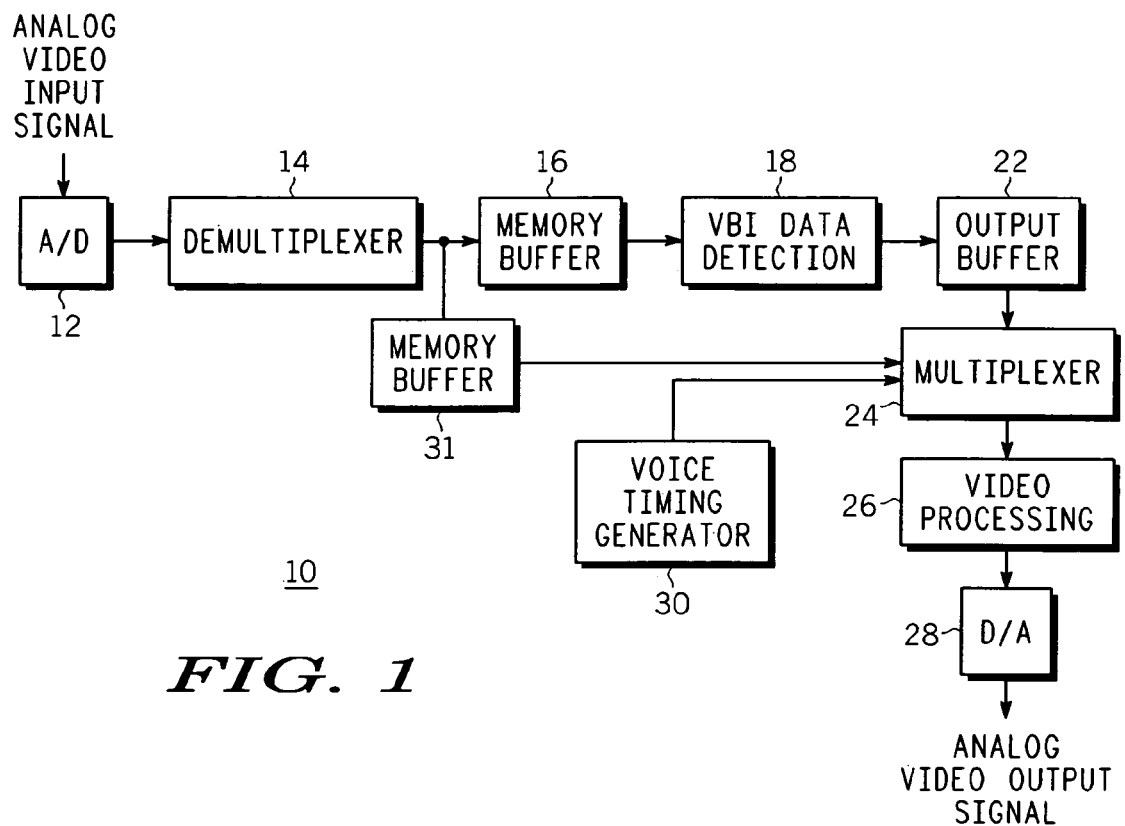
FIG. 1 is a block diagram of a video signal processing system that includes a vertical blanking interval (VBI) data detection apparatus.

In the following description, like reference numerals indicate like components to enhance the understanding of the data detection method and apparatus through the description of the drawings. Also, although specific features, configurations and arrangements are discussed hereinbelow, it should be understood that such specificity is for illustrative purposes only. A person skilled in the relevant art will recognize that other steps, configurations and arrangements are useful without departing from the spirit and scope of the invention.

The vertical blanking interval (VBI) is a plurality of video lines that occupies the vertical blanking interval portion of an analog video signal or television signal. The VBI lines or VBI signal lines typically do not contain any broadcast audio or video information. However, the video broadcast industry uses VBI lines to carry test signals, closed-captioned signals and other information that is not part of the audio or video information of the television signal being broadcasted. In video signal lines formatted according to the National Television System Committee (NTSC) video signal standard, signal lines 10 through 21 and signal lines 273 through 284 are part of the VBI. Also, signal lines 22 and 285 sometimes are used to carry VBI data. In video signal lines formatted according to the Phase Alternation Line (PAL) video signal standard, signal lines 11 through 22 and signal lines 324 through 335 are considered part of the VBI.

Prior to being coupled to a television receiver or other user system, the television signal often is coupled to or passes through one or more video processing devices, such as a signal converter box or signal decoder box (often referred to as a set-top box), a video cassette recorder (VCR), a digital video disk (DVD) recorder, a computer, or another suitable video (and audio) receiver. Some of these video processing devices may have a direct analog path from the device input to the device output. Those devices that do not have a direct analog path through the device typically convert one or more portions of the analog video signal (including the VBI portion) to digital format for processing, then convert the digital signal portions back to analog format before routing the analog signal to the device output.

For economic reasons, many of these video processing devices have processors or processing units that are sized and powered to meet mainly the primary purposes of the device. Such purposes include, e.g., audio services, video services, internal device programs like playback and recording functions, and user interface controls for such functions. In these devices, the processing overhead required to perform other tasks, e.g., to read all of the lines of the VBI portion of the video signal, including those VBI lines that do not contain VBI data, can unduly hinder the processing ability of the device.

For example, processing devices typically generate a number of 8-bit digital samples, e.g., 720 8-bit samples, for each video signal line, including each VBI signal line. For 12 VBI signal lines (e.g., VBI signal lines 10 through 21), at a typical transfer/processing rate of 60 times per second, conventional video processing devices have to transfer more than 4 million bits of data per second. Such transfer rates can rapidly consume much of the processing power of conventional video processing devices.

Referring now to FIG. 1, shown is a block diagram of a video processing device or system 10 including a VBI data detection apparatus and method. The video processing device or system 10 can be any suitable device or system for processing video signals, such as a DVD recorder, a computer, a VCR, or a signal converter box, e.g., any one of the following Motorola set-top boxes: DCT5000, DCT5100, DCT6100, DCT6200, DCT6208, DCT6412, DCT3412, M2QIP6200, and M2QIP6416.

The VBI data detection apparatus detects the VBI signal lines from the video signal that contain VBI data and pass only those VBI lines containing VBI data to the appropriate processing unit of the video processing device. The detecting apparatus (and method), or at least a portion thereof, typically is part of the video processing device, i.e., is completely or partially implemented within the video processing device as software or hardware or both. However, alternatively, the detecting apparatus and method can be a complete or partial software and/or hardware upgrade to the video processing device, or a hardware add-on or interface (including software) to the video processing device.

As shown in FIG. 1, the video processing system 10 includes an analog-to-digital (A/D) converter 12, a video signal demultiplexer or VBI demultiplexer 14, a first memory buffer 16, a VBI data detection apparatus 18, an output (memory) buffer 22, a video signal multiplexer or VBI multiplexer 24, a video processing component 26, a digital-to-analog (D/A) converter 28, a video timing generator 30, and a second memory buffer 31. The video processing system 10 can be included as part of any suitable video processing system, apparatus or method.

The A/D converter 12 has an input line that receives the analog video input signal, e.g., a television signal formatted according to the National Television System Committee (NTSC) video signal standard, the Phase Alternation Line (PAL) video signal standard, or other suitable format. The data detection apparatus and method described herein is suitable for use with video signals that are formatted according to any suitable video standard, including the NTSC and PAL standards.

The A/D converter 12 converts the analog video input signal to a digital format, e.g., a digital format defined by an industry standard. Such formats include those established by the International Telecommunication Union Radiocommunication (ITU-R) Sector, e.g., ITU-R BT-601 and ITU-R BT-656, or other comparable formats. From the A/D converter 12, the digital video signal, which signal now contains a digitized version of both the active video lines portion and the VBI lines portion of the video input signal, is input to the demultiplexer (demux) 14. Alternatively, the video processing system 10 receives a digital video signal directly. In such case, the video processing system 10 does not include the A/D converter 12. Also, alternatively, the video processing system 10 outputs a digital video signal. In such case, the video processing system 10 does not include the D/A converter 28.

The demultiplexer 14 receives the digital video signal and separates or demultiplexes the active video signal lines portion and the VBI signal lines portion from one another. As discussed previously herein, the VBI signal lines typically are lines 10-21 and 273-284 of an NTSC-formatted video signal, or lines 11-22 and 324-335 of a PAL-formatted video signal. The demultiplexer 14 routes the active video signal lines to the multiplexer 24, and routes the VBI signal lines to the first memory buffer 16. From the first memory buffer 16, the VBI signal lines are input to the VBI data detection apparatus 18.

Figure 2:
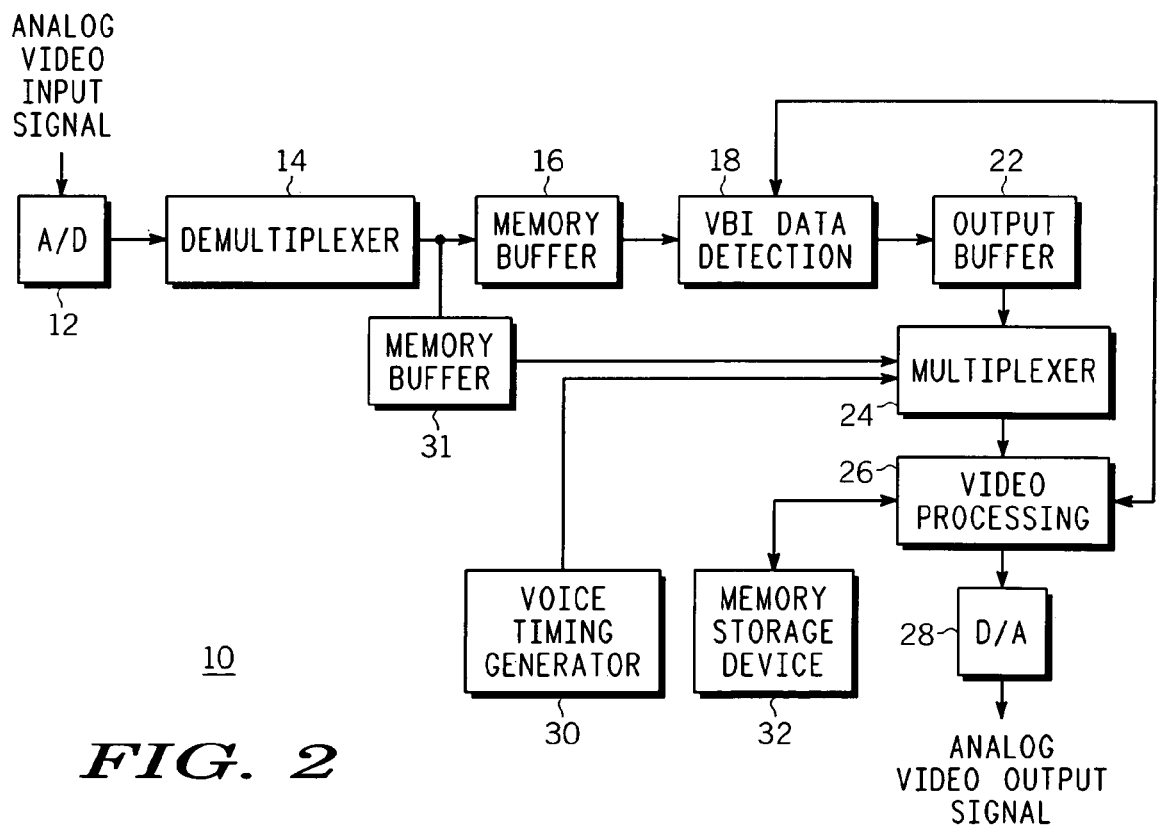
FIG. 2 is a block diagram of a video signal processing system that includes an alternative configuration of the VBI data detection.

The VBI data detection apparatus 18 can be completely or partially configured in the form of hardware circuitry and/or other hardware components within the video processing system 10, e.g., as shown in FIG. 1. Alternatively, as shown in FIG. 2, the VBI data detection can be completely or partially configured in the form of software, e.g., as processing instructions or one or more sets of logic or computer code. In such configuration, the logic or processing instructions typically are stored in a data storage device, shown generally as 32, which typically is coupled to the video processing component 26. The video processing component 26 accesses the necessary instructions from the data storage device 32 and executes the instructions or transfers the instructions to the appropriate location within the video processing system 10. Such location or execution is shown in FIG. 2 generally as VBI data detection 18, which is functionally similar to the VBI data detection apparatus 18 shown in FIG. 1.

Figure 3:
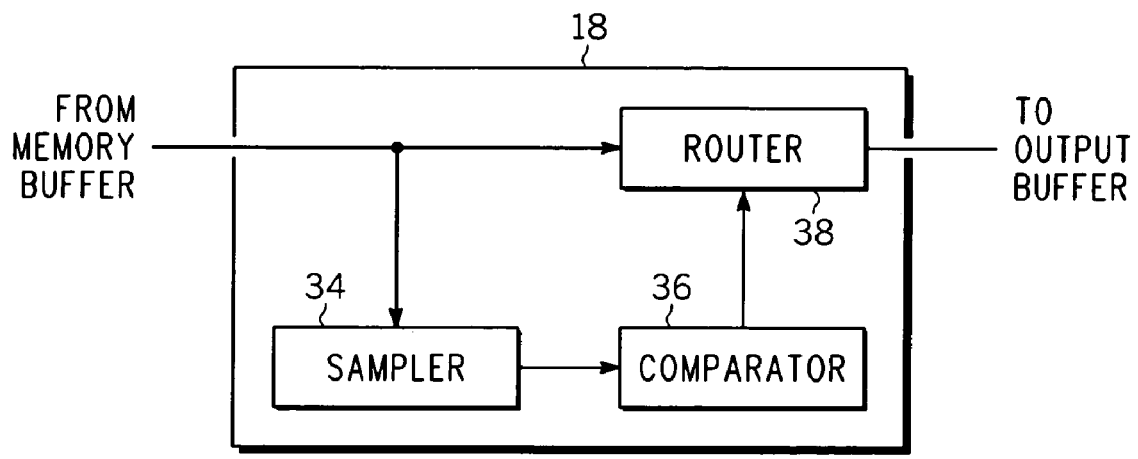
FIG. 3 is a block diagram of the VBI data detection apparatus shown in FIG. 1.

Referring now to FIG. 3, shown is a block diagram of the VBI data detection apparatus 18. The VBI data detection apparatus 18 includes a sampler 34, a comparator 36 and a router 38. The VBI data detection apparatus 18 can be comprised of any suitable structure or arrangement, e.g., one or more integrated circuits. Alternatively, one or more of the components comprising the VBI data detection apparatus 18 can be comprised of any suitable structure or arrangement, e.g., one or more integrated circuits. Also, alternatively, one or more of the elements comprising any one or more of the components comprising the VBI data detection apparatus can be comprised of any suitable structure or arrangement, e.g., one or more integrated circuits.

In operation, the VBI data detection apparatus 18 samples one or more points in the VBI signal lines and compares the sample to a threshold to determine if the sample contains VBI data. If the sample contains VBI data, the particular VBI line from which the sample was taken is routed for further processing, as will be discussed in greater detail hereinbelow. VBI signal lines that do not contain any VBI data are not routed or processed further.

In more detail, the sampler 34 samples the VBI signal lines input to the VBI data detection apparatus 18 from the first memory buffer 16. The sampler 34 can sample the VBI signal lines in any suitable manner. For example, the sampler 34 can be configured to systematically take the same number of samples from each VBI signal line. Alternatively, the sampler 34 can be configured to randomly take varying numbers of samples from each VBI signal line. Regardless of the sampling technique, the sampler 34 typically is configured to take one or more samples from each VBI signal line. In an alternative system, the sampler 34 takes all samples from each VBI signal line.

VBI signal lines are each comprised of a plurality of points, with some points containing VBI data and some points not containing VBI data. Often, a portion of the points in VBI lines are allocated or reserved for information other than VBI data. For example, a first field of points in the VBI line is allocated for non-VBI data information, such as control signals, test signals, synchronization signals, and/or information identifying the start of a new line. In such configuration, the remaining points or fields beyond such "header" or control field are used for VBI data. It is these points that are sampled for the presence of VBI data.

In one type of configuration, the control field is a fixed length of points. In such configuration, the sampler 34 samples points beyond the fixed-length control field. In another type of configuration, the control field is a variable length control field. In such configuration, the sampler 34 looks for an indication that the end of the control field has been reached before taking any samples.

When sampling one or more points in a VBI signal line, the sampler 34 can take any suitable type of sample. That is, the sampler 34 can sample any suitable data characteristics from the points in the VBI signal line. For example, typically, the sampler 34 will sample the luminance of one or more points in the VBI signal line. However, the sampler 34 may sample other suitable data characteristics from the points in the VBI signal line.

The sample taken by the sampler 34 is input to the comparator 36. The comparator 36 compares the sample to a threshold. For example, for a luminance sample taken by the sampler 34, the comparator 36 compares the luminance of the sample to a threshold luminance level suitable to establish the difference between the presence or absence of VBI data. For example, on a scale of 0-100 IRE units (from the Institute of Radio Engineers), where 0 IRE is black and 100 IRE is pure white, a suitable luminance threshold for delineating the presence of VBI data from the absence of VBI data can be approximately 25 IRE.

It should be understood that the threshold level is adjustable and can be adjusted, either automatically or manually, for any suitable reason. For example, the threshold level can be adjusted based on the relative overall quality of the video signal information input to the video processing system 10. In such configuration, a memory device may be used in conjunction with the VBI data detection apparatus in FIG. 3 to store one or more threshold values, e.g., one or more luminance threshold values. Such threshold values may be retrieved automatically or manually, based on the overall luminance of one or more frames of video signal information.

If the level of luminance (or other data characteristic) from one of the sample points from a given VBI signal line is greater than or equal to the threshold level, the VBI signal line contains VBI data. In such case, no more samples need be taken from the given VBI signal line and the comparator 36 instructs the router 38 to route the given VBI signal line to the output buffer 22. If the level of luminance from a sampled point from a given VBI signal line is less than the threshold level, the sampler 34 typically samples another point, either systematically or randomly. For example, if the sampler 34 is configured to systematically sample the VBI lines, the sampler 34 may sample the same points in each VBI line, until VBI data is detected, if at all. Alternatively, if the sampler 34 is configured to randomly sample the VBI lines, the sampler 34 will sample random points in each VBI line until VBI data is detected, if at all.

The sampler 34 continues taking sample points from the VBI signal line until the end of the VBI signal line has been reached. If none of the sampled points from a given VBI signal line is greater than or equal to the threshold, the VBI signal line is determined not to contain VBI data. In such case, the comparator 36 instructs the router 38 not to route that VBI signal line to the output buffer 22, and the particular VBI line is not processed further.

Referring again to FIGS. 1 and 2, with continuing reference to FIG. 3, once all of the VBI signal lines have been sampled and the VBI signal lines that contain VBI data have been routed to the output buffer 22, the output buffer 22 outputs the VBI signal lines that contain VBI data to the multiplexer (mux) 24. The multiplexer 24 recombines the digital video signal by combining the active video signal lines received from the demultiplexer 14 with the VBI signal lines (that contain VBI data) routed from the VBI data detection apparatus 18 to the output buffer 22.

The second memory buffer 31 synchronizes the recombination efforts of the multiplexer 24 so that the VBI signal lines that contain VBI data are properly recombined with the active video signal lines. The video timing generator 30 holds the space or maintains the proper spacing within the VBI lines to account for the VBI lines that did not contain VBI data and thus were not routed to the output buffer 22. Such areas of the VBI line portion are seen as blank lines. In this manner, the video timing generator 30 allows the multiplexer 24 to recombine the digital video signal without adversely affecting the timing or spacing of the output video signal.

Once the digital video signal has been recombined, the multiplexer 24 outputs the digital video signal to the video processing component 26. In the video processing system 10 shown in FIGS. 1 and 2, the video processing component 26 is shown to represent generally audio and video components and associated functions related to the primary services of the video processing system 10. For example, if the video processing system 10 is a DVD recorder, the video processing component 26 can collectively represent, in general, DVD recording and playback functions, as well as user interface controls for such functions, among other functions, components and services of the video processing system.

As discussed previously herein, because of the work of the VBI data detection apparatus 18, the VBI signals that do not contain VBI data are not processed further and thus are not recombined with the active video signal lines. In this manner, the video processing component 26 processes only those VBI signal lines that contain VBI data, thus typically reducing the number of VBI signal lines that have to be processed. Thus, the amount of processing resources needed by the video processing component 26 to process the VBI signal lines is reduced, thus allowing the video processing component 26 to use such processing resources for other purposes.

After processing the digital video signal, the video processing component 26 routes the digital video signal to the D/A converter 28. The D/A converter 28 converts the digital video signal from its digital format back to its original analog format. The analog video output signal output from the D/A converter 28 then is routed to an appropriate user system, e.g., a television, computer or other suitable user system (not shown).

Figure 4:
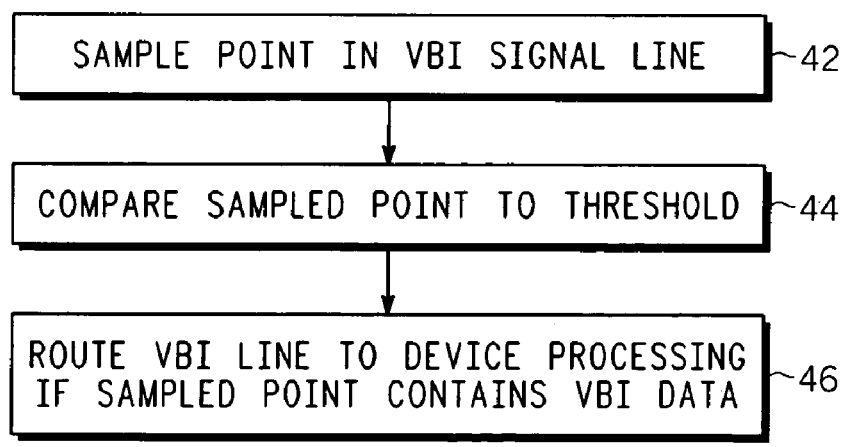
FIG. 4 is a block diagram of a VBI data detection method.

Referring now to FIG. 4, shown is a block diagram of a VBI data detection method. The method 40 includes a sampling step 42, a comparing step 44 and a routing step 46. The sampling step 42 samples one or more points of the VBI signal lines. As discussed hereinabove, the points are sampled in any suitable manner, e.g., systematically or randomly. Also, the sampling step 42 samples the points in the VBI signals lines for any one or more suitable data characteristics, e.g., luminance.

The comparing step 44 compares the sampled point to an established threshold level. As discussed previously herein, if the level of the data characteristic of the sampled point line is greater than or equal to the threshold level, the VBI signal line from which the sampled point was taken contains VBI data. If none of the sampled points from a given VBI signal line is greater than or equal to the threshold level, that particular VBI signal line does not contain VBI data.

The method also includes a routing step 46. If the VBI signal line contains VBI data, the routing step 46 routes the VBI signal line to the processing component of the processing device or system. If the VBI signal line does not contain VBI data, the routing step 46 does not route the VBI signal line to the processing component and no further processing is performed on that particular VBI signal line. The sampling step 42, the comparing step 44 and the routing step 46 (if necessary) are repeated for one or more sample points in each VBI signal line until all the VBI signal lines have had at least one point sampled.

Figure 5:
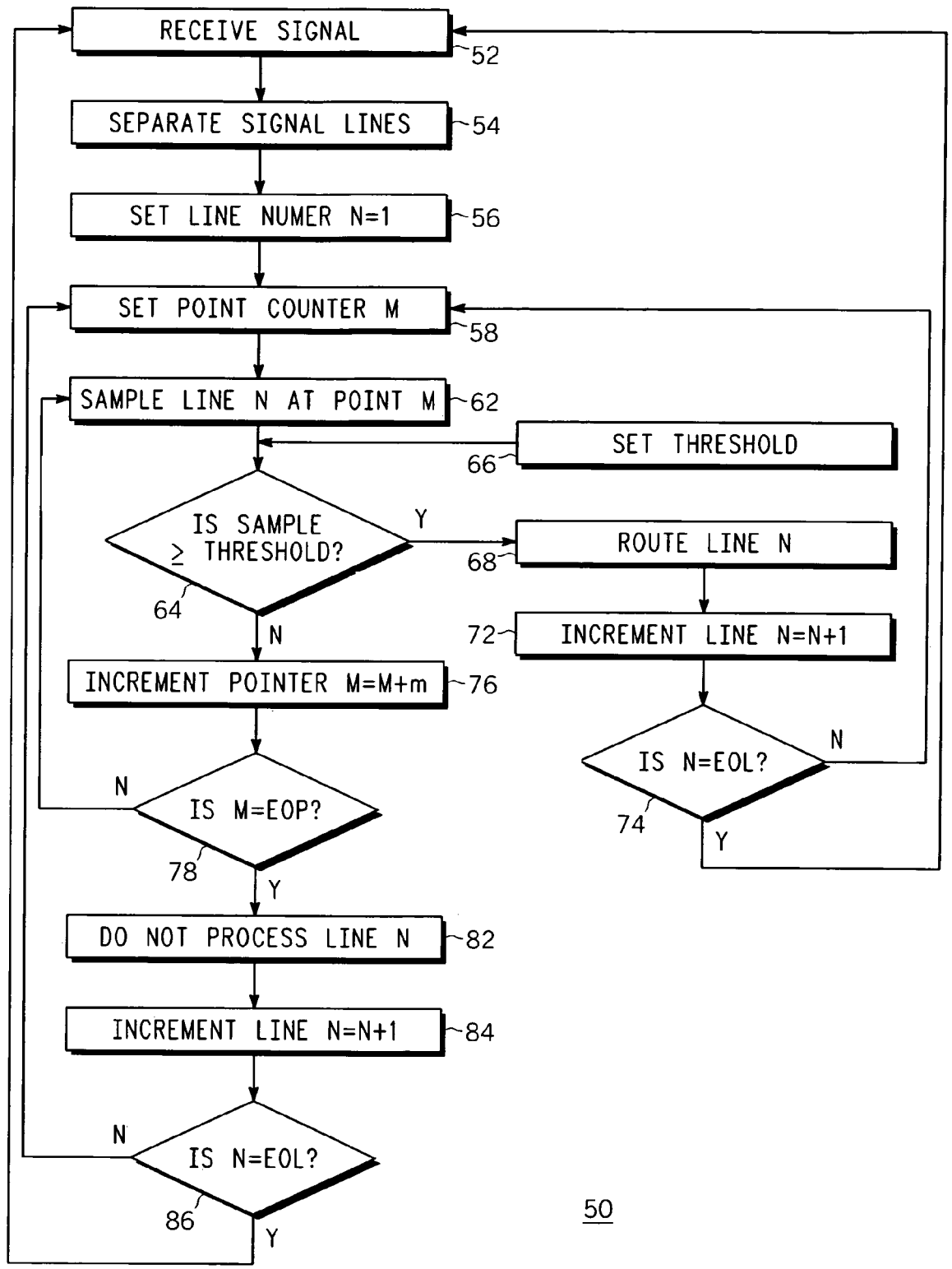
FIG. 5 is a flow diagram of the VBI data detection method.

Referring now to FIG. 5, shown is a flow diagram 50 of the VBI data detection method. Initially, the video signal is received 52 by the apparatus, e.g., by the A/D converter 12. The VBI lines are separated 54 from the active video lines by the demultiplexer 14. The VBI lines are transmitted to the VBI data detection apparatus 18, e.g., via the first memory buffer 16.

Within the VBI data detection apparatus 18, the line number, N, of the VBI lines to be sampled is set 56 to 1 (N=1). Also, the point counter, M, of the point M to be sampled within the VBI line N is set 58. As discussed hereinabove, for systematic sampling, the point counter M can be set to the same points within each sampled line. Alternatively, for random sampling, the point counter M can be set to different points within the each sampled line.

Once the line number N and the point counter M have been set, a sample is taken 62 by the sampler 34 at point M of line N. As discussed hereinabove, the sampler 34 can sample any suitable data characteristic, e.g., luminance. The sampled point M in line N then is compared 64 by the comparator 36 to a threshold, which has been set 66 by the VBI data detection apparatus 18.

If the sampled point M in line N is greater than or equal to the threshold, VBI data exists in the sample line N, and the line N is routed 68 by the router 38 for further processing. The line number N then is incremented 72 by 1 (N=N+1). Once the line number N has been incremented, it is determined 74 if the line number N has reached the end of the VBI lines (shown as EOL).

If the line number N has not reached the end of the VBI lines, then the point counter M is set (or reset) 58. If the line number N has reached the EOL or the end of the VBI lines, then the next frame or set of VBI lines is received 52 by the apparatus.

Returning to the comparison function block 64 where the sampled point M in line N is compared to the threshold, if the sampled point M in line N is less than the threshold, the point counter M is incremented 76 m points to the next sample point (i.e., M=M+m). Once the sample point M has been incremented to the next sample point, it is determined 78 if the sample point M has reached the end of the points (shown as EOP) in the VBI line N.

If the incremented sample point M has not reached the end of the points in the VBI line N, the next point M is sampled 62. If the incremented sample point M has reached the end of the points in the VBI line N, the line N is not routed 82 for further processing because no VBI data has been detected on the sample line N.

Once it has been determined that the line N is not to be routed for further processing, the line number N then is incremented 84 by 1 (N=N+1). Once the line number N has been incremented, it is determined 86 if the line number N has reached the end of the VBI lines (EOL).

If the line number N has not reached the end of the VBI lines, then the point counter M is set (or reset) 58. If the line number N has reached the EOL or the end of the VBI lines, then the next frame or set of VBI lines is received 52 by the apparatus.

It will be apparent to those skilled in the art that many changes and substitutions can be made to the VBI data detection apparatus and method herein described without departing from the spirit and scope of the invention as defined by the appended claims and their full scope of equivalents.

What is claimed is:

1. A method for detecting data in a vertical blanking interval (VBI) line, the VBI line including a plurality of points, the method comprising:
   sampling at least one point of at least one VBI line;
   determining if the level of at least one data characteristic of the at least one sampled point in the VBI line is greater than or equal to a first threshold; and
   routing the VBI line to a first data path if the level of the at least one data characteristic of the at least one sampled point in the VBI line is greater than or equal to the first threshold, wherein the first data path comprises a data path through a processing unit of a processing device,
   wherein, if the VBI line is determined not to include any sampled points that have the level of the at least one data characteristic greater than or equal to the first threshold, the VBI line is not routed to the processing unit.

2. The method as recited in claim 1, wherein the at least one data characteristic further comprises luminance.

3. The method as recited in claim 1, wherein the at least one point of the at least one VBI line is sampled systematically.

4. The method as recited in claim 1, wherein the at least one point of the at least one VBI line is sampled randomly.

5. An apparatus for detecting data in a vertical blanking interval (VBI) line, the VBI line including a plurality of points, the apparatus comprising:
   a sampler for sampling at least one point of at least one VBI line;

a comparator for determining if the level of at least one data characteristic of the at least one sampled point in the VBI line is greater than or equal to a first threshold, and a router for routing the VBI line to a processing unit of a processing device if the level of the at least one data characteristic of the at least one sampled point in the VBI line is greater than or equal to the first threshold, wherein, if the comparator determines that the VBI line does not include any sampled points that have the level of the at least one data characteristic greater than or equal to the first threshold, the router does not route the VBI line to the processing unit.

6. The apparatus as recited in claim 5, wherein the comparator determines if the level of luminance of the sampled point is greater than or equal to the first threshold.

7. The apparatus as recited in claim 5, wherein the sampler systematically samples the at least one point of the at least one VBI line.

8. The apparatus as recited in claim 5, wherein the sampler randomly samples the at least one point of the at least one VBI line.

9. The apparatus as recited in claim 5, further comprising a demultiplexer for demultiplexing the VBI line from an active signal line portion of a video signal, wherein the demultiplexer transmits the VBI line to the sampler via a memory buffer.

10. The apparatus as recited in claim 9, further comprising a multiplexer for multiplexing the VBI line with the active signal line portion of the video signal, wherein the demultiplexer routes the active signal line portion of the video signal to the multiplexer, and wherein the router routes the VBI line to the demultiplexer via an output buffer.

11. The apparatus as recited in claim 5, wherein at least one of the sampler, the comparator, and the router is implemented in software executed by a computer.

12. The apparatus as recited in claim 5, wherein at least one of the sampler, the comparator, and the router is implemented in hardware.

13. The apparatus as recited in claim 5, wherein at least a portion of the apparatus is contained in the video processing device.

14. The apparatus as recited in claim 5, wherein at least a portion of the apparatus further comprises an integrated circuit.

15. The apparatus as recited in claim 5, wherein the processing device is selected from the group consisting of a signal converter box, a signal decoder box, a video cassette recorder, a digital video disk recorder, a computer, an audio receiver, and a video receiver.

16. A computer readable medium only readable by a computer carrying a computer program for detecting data in a vertical blanking interval (VBI) line, the VBI line including a plurality of points, the program comprising:

code for sampling at least one point of at least one VBI line;

code for determining if the level of at least one data characteristic of the at least one sampled point in the VBI line is greater than or equal to a first threshold; and code for routing the VBI line to a first data path if the level of the at least one data characteristic of the at least one sampled point in the VBI line is greater than or equal to the first threshold, wherein the first data path further comprises a data path through a processing unit of a processing device, wherein, if the VBI line is determined not to include any sampled points that have the level of the at least one data characteristic greater than or equal to the first threshold, the VBI line is not routed to the processing unit.

17. The computer program as recited in claim 16, wherein the determining code further comprises code for determining if the level of luminance of the sampled point is greater than or equal to the first threshold.

18. The computer program as recited in claim 16, wherein the sampling code further comprises code for randomly sampling the at least one point from the at least one VBI line.

* * * * *